(12) United States Patent
Finkelstein

(10) Patent No.: US 7,159,829 B1
(45) Date of Patent: Jan. 9, 2007

(54) HEIGHT ADJUSTABLE SUPPORT FOR FOOD SERVICE EQUIPMENT

(75) Inventor: Burl Finkelstein, Newman, GA (US)

(73) Assignee: Kason Industries, Inc., Shenandoah, GA (US)

( * ) Notice: Subject to any disclaimer, the term of this patent is extended or adjusted under 35 U.S.C. 154(b) by 0 days.

(21) Appl. No.: 10/870,762

(22) Filed: Jun. 18, 2004

(51) Int. Cl.
*F16M 11/24* (2006.01)

(52) U.S. Cl. .................. 248/188.4; 16/32; 108/144.11; 248/188.2; 248/188.8

(58) Field of Classification Search ............ 248/188.4, 248/188.5, 188.2, 161, 357, 405, 188.8; 52/126; 108/144.1, 144.11, 147.22; 297/344.18, 297/338, 461; 16/32, 19, 45
See application file for complete search history.

(56) References Cited

U.S. PATENT DOCUMENTS

| | | | |
|---|---|---|---|
| 1,408,588 A | 3/1922 | Wise et al. ............... 248/314 |
| 2,339,577 A | 1/1944 | Nalle ........................... 16/19 |
| 2,365,287 A | 12/1944 | Nalle ........................... 16/19 |
| 2,384,020 A | 9/1945 | Farson .................... 248/188.5 |
| 2,385,154 A | 9/1945 | Nalle ........................... 16/19 |
| 2,403,338 A | 7/1946 | Butler ........................ 108/64 |
| 2,534,575 A | 12/1950 | Conley et al. ........... 280/405.1 |
| 2,670,748 A * | 3/1954 | Greene et al. ............... 135/69 |
| 2,828,578 A | 4/1958 | McCabe .................. 248/188.4 |
| 3,329,105 A * | 7/1967 | McPherson .................... 108/4 |
| 4,151,853 A * | 5/1979 | Inbar ........................... 135/71 |
| 4,313,586 A * | 2/1982 | Grzesnikowski ......... 248/188.4 |
| 4,723,633 A | 2/1988 | Duncan ....................... 182/230 |
| 4,918,783 A | 4/1990 | Chu ............................ 16/19 |
| 5,001,808 A | 3/1991 | Chung .................... 16/18 CG |
| 5,040,758 A | 8/1991 | Giovannetti ............. 248/188.4 |
| D334,136 S | 3/1993 | McCord et al. .............. D8/375 |
| 5,457,849 A | 10/1995 | Branson et al. ................ 16/19 |
| 5,536,068 A * | 7/1996 | Valentor et al. ........ 297/344.18 |
| 5,881,980 A * | 3/1999 | Knudson ................. 248/188.8 |
| 6,354,231 B1* | 3/2002 | Morris ................... 108/144.11 |
| 6,568,757 B1* | 5/2003 | Lin et al. ................. 297/344.1 |
| 6,796,001 B1* | 9/2004 | Finkelstein .................... 16/32 |
| 6,799,660 B1* | 10/2004 | Crawford .................... 182/200 |

OTHER PUBLICATIONS

Hardware and Accessories Engineered for Commercial Refrigeration, Food Service and, Transportation Equipment. Kason ® Catalog 6 pp. 113-120.

* cited by examiner

*Primary Examiner*—Carl D. Friedman
*Assistant Examiner*—Tan Le
(74) *Attorney, Agent, or Firm*—Baker Donelson

(57) ABSTRACT

A support (10) is disclosed for use with food service equipment. The support has a tubular upper portion (11) and a tubular lower portion (12) telescopically mounted within the upper portion for adjustable vertical movement. The upper portion has a plastic support body (15) surrounded by a stainless steel support sleeve (16). A steel, externally threaded stud (17) is mounted to the support body. The lower portion includes a stainless steel, tubular foot (22) having a plastic glide (23) press fitted into its lower end and metal insert (24) mounted in its top end. The metal insert has internally threaded, central channel (25) extending completely therethrough. The insert is threaded onto the bottom end of the threaded stud for threaded vertical movement along the stud.

10 Claims, 3 Drawing Sheets

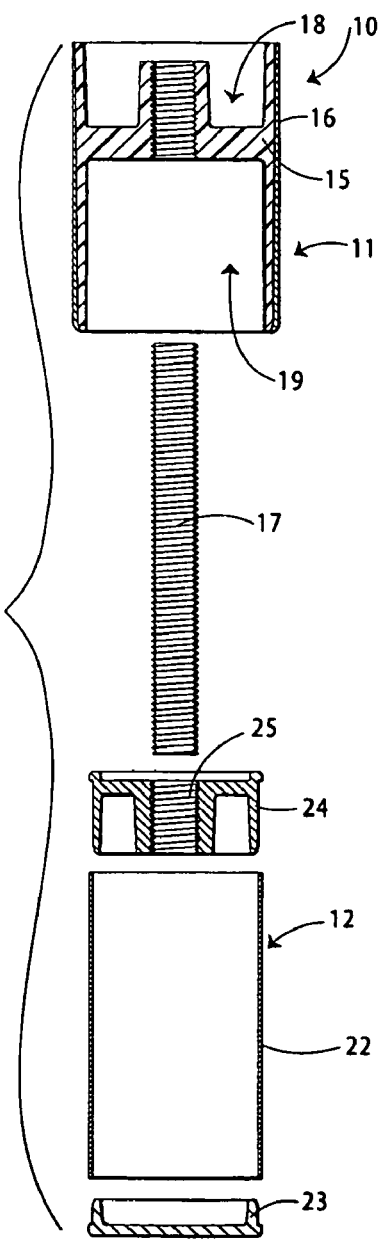
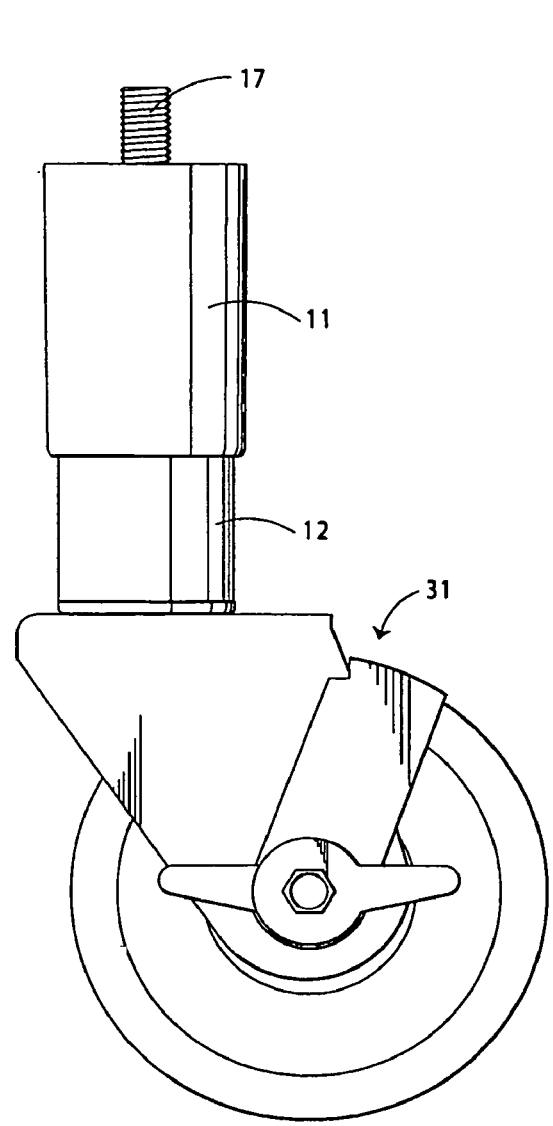

44

HEIGHT ADJUSTABLE SUPPORT FOR FOOD SERVICE EQUIPMENT

TECHNICAL FIELD

This invention relates generally to supports for commercial food service equipment, and particularly to height adjustable legs and casters for such equipment.

BACKGROUND OF THE INVENTION

Commercial food service equipment is often supported upon a floor by legs or casters. Most equipment in commercial kitchens is set to a common work height. Adjustable legs and leveling devices are used to allow for height adjustments to achieve a common height regardless of factory preset heights. Height adjustments are also needed where the floor is not level or even.

Casters are usually not adjustable in height. Those few that are normally require different mountings than those for the fixed legs or feet that they replace. For safety these must be designed so that a leg or caster may not come off during adjustment. These thus have tended to require rather complex machined adjustment components as exemplified by that shown in U.S. Pat. No. Des 334,136.

In addition, food service equipment often needs to be adopted to either a mobile or immobile configuration at installation. For example, pizza ovens installed in a pizzeria normally have fixed legs while those installed in a convention center have casters for relocation from time to time. Ease of convertibility without the need for change in the equipment's legs or leg sockets is thus desirable.

Adjustable casters have existed which have an upper portion 1 mounted to the bottom of the food service equipment leg and a bottom portion or foot 2 which is adjustable in height, as shown in FIG. 1. The upper portion includes a stainless steel tubular housing 3 and a metal, threaded post 4. The food service equipment leg is threaded onto the top portion of the threaded post while the foot is threaded for adjustable movement upon the bottom portion of the threaded post. The post is fixedly mounted to the tubular housing by welding metal rings 5 to the interior of the tubular housing and to the threaded post. However, problems commonly arises with these casters which stem from these welded rings. If the metal rings are not properly centered within the housing the foot will be off-centered from the housing. A large offset may prevent the foot from being inserted into the housing. A smaller offset may cause the gap 6 between the housing and the foot therein to be uneven or asymmetrical, thereby creating a gap size therebetween to be greater than those allowed by the food service industry regulations, for a gap greater than the minimal size creates an area which allows insects to enter.

Accordingly, it is seen that a need remains for height adjustable supports for food service equipment of more simplified construction and which provides a uniform construction and installment. It is to the provision of such that the present invention is primarily directed.

SUMMARY OF THE INVENTION

In a preferred form of the invention a height adjustable support is provided for supporting food service equipment and the like at different elevations above a supporting floor. The support comprises a metal sleeve mounted tightly about a plastic body having a central passage therethrough, an externally threaded stud fixedly mounted within the central passage, and a foot having a threaded passage therein. The stud is threadably coupled within the foot threaded passage for threaded movement along the stud. With this construction, the support may be coupled as the leg of a food service equipment by threading the top end of the threaded stud into the equipment leg and whereby the height of the equipment may be adjusted by threadably positioning the foot along the lower end of the threaded stud.

BRIEF DESCRIPTION OF THE DRAWING

FIG. 3 is an exploded view of the height adjustable support of FIG. 1.

FIG. 4 is a side view of a height adjustable support shown in another preferred embodiment.

DETAILED DESCRIPTION

Figure 1:
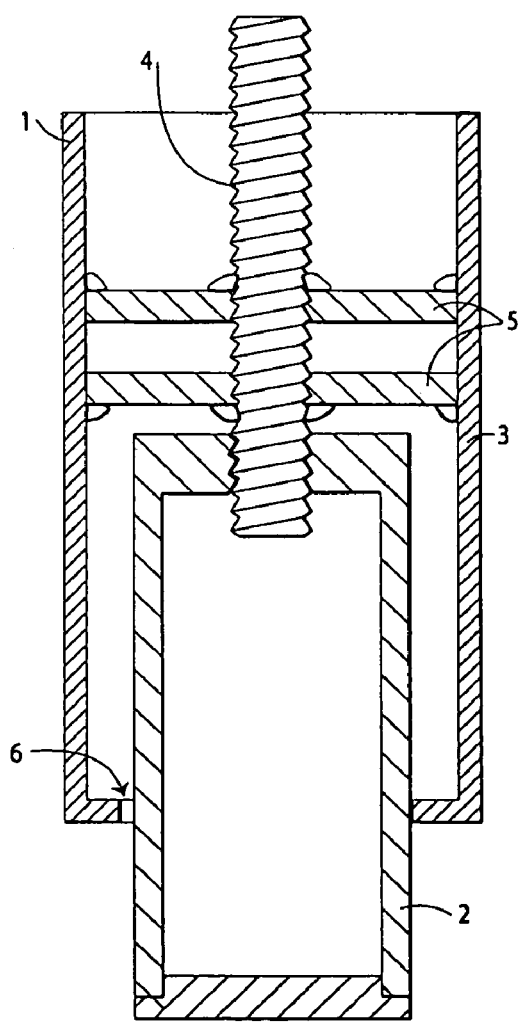
FIG. 1 is a cross-sectional view of a prior art height adjustable support.
Figure 2:
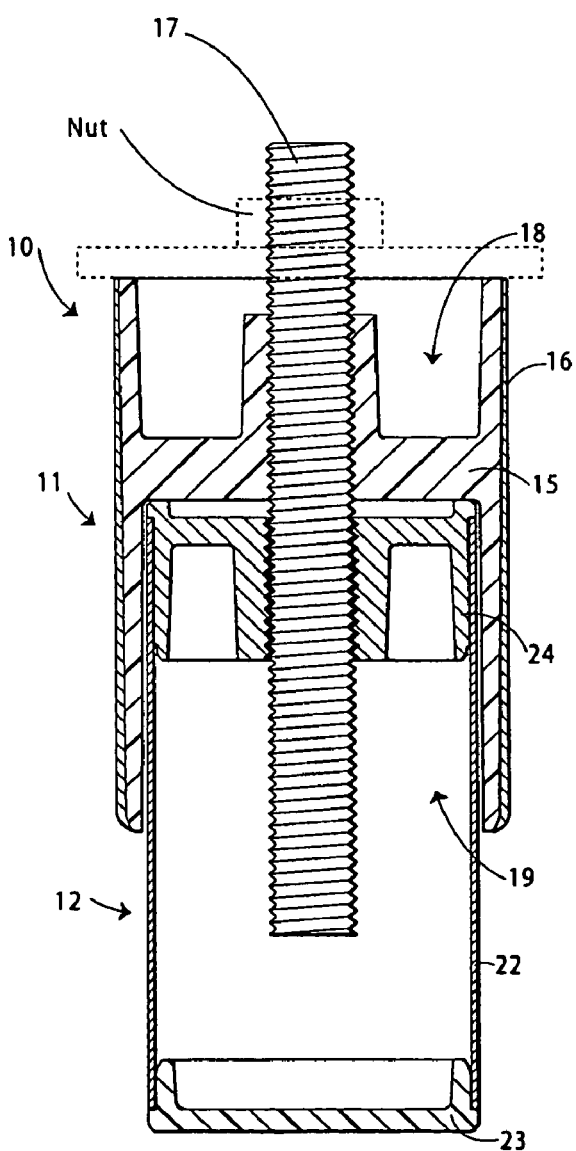
FIG. 2 is a cross-sectional view of a height adjustable support that embodies the invention in a preferred form shown positioned beneath the bottom of food service equipment leg for mounting.

With reference now in more detail to the drawing, there is shown in FIGS. 2 and 3 a fragment of the bottom portion of a piece of food service equipment. Where the food service equipment is generally rectangular, as it often is, it may have a leg adjacent each of its four bottom corners. Of course it may have more, depending upon its size and weight. In this case the food service equipment, shown in phantom lines, has an internally threaded channel therein. Positioned beneath the equipment for mounting thereto is a leg in the form of a height adjustable support 10 embodying principles of the present invention.

Each support 10 has a tubular upper portion 11 and a tubular lower portion 12 telescopically mounted within the upper portion 11 for adjustable vertical movement. The upper portion 11 has a plastic support body 15 which is press fitted within a stainless steel support sleeve 16. The support body 15 is molded about a centralized, zinc plated steel, externally threaded stud or post 17. The support body 15 prevents rotational movement of the threaded stud 17. The combination of the body 15 and stud 17 forms a annularly-shaped top recess 18 and an annularly-shaped bottom recess 19.

The lower portion 12 includes a stainless steel, tubular foot 22 having a plastic glide 23 mounted in its lower end and metal insert 25 mounted in its top end. The metal insert 24 has internally threaded, central channel 25 extending completely therethrough. The insert 24 is threaded onto the bottom end of the threaded stud 17 for threaded vertical movement along the stud. It should be noted that the bottom end of the stud 17 is deformed once the inserted is threaded thereon in order to prevent the lower portion 12 from being accidently dismounted from the upper portion 11 during adjustable movement. Such accidental disengagement of the leg can pose a significant hazard as it may cause material upon the equipment, such as gallons of hot oil, to spill or the equipment to fall upon a person adjusting the leg.

In mounting the support 10 to the equipment the top end of the stud 17 is threaded into the threaded channel of the equipment. The lower portion 12 is then rotated relative to the upper portion 11, thereby threading it along the stud 17 to a desired height. If needed, the height may be later reset by simply rotating the lower portion so as to change the overall height of the equipment.

With reference next to FIG. 4, there is shown another preferred form of the invention. Here the support is essentially the same as that previously described in reference to FIGS. 2 and 3 except for the addition of a wheel assembly 31. Both the castor configuration of FIGS. 2 and 3 or the wheeled assembly configuration of FIG. 4 may be considered a floor engaging member.

Figure 5:
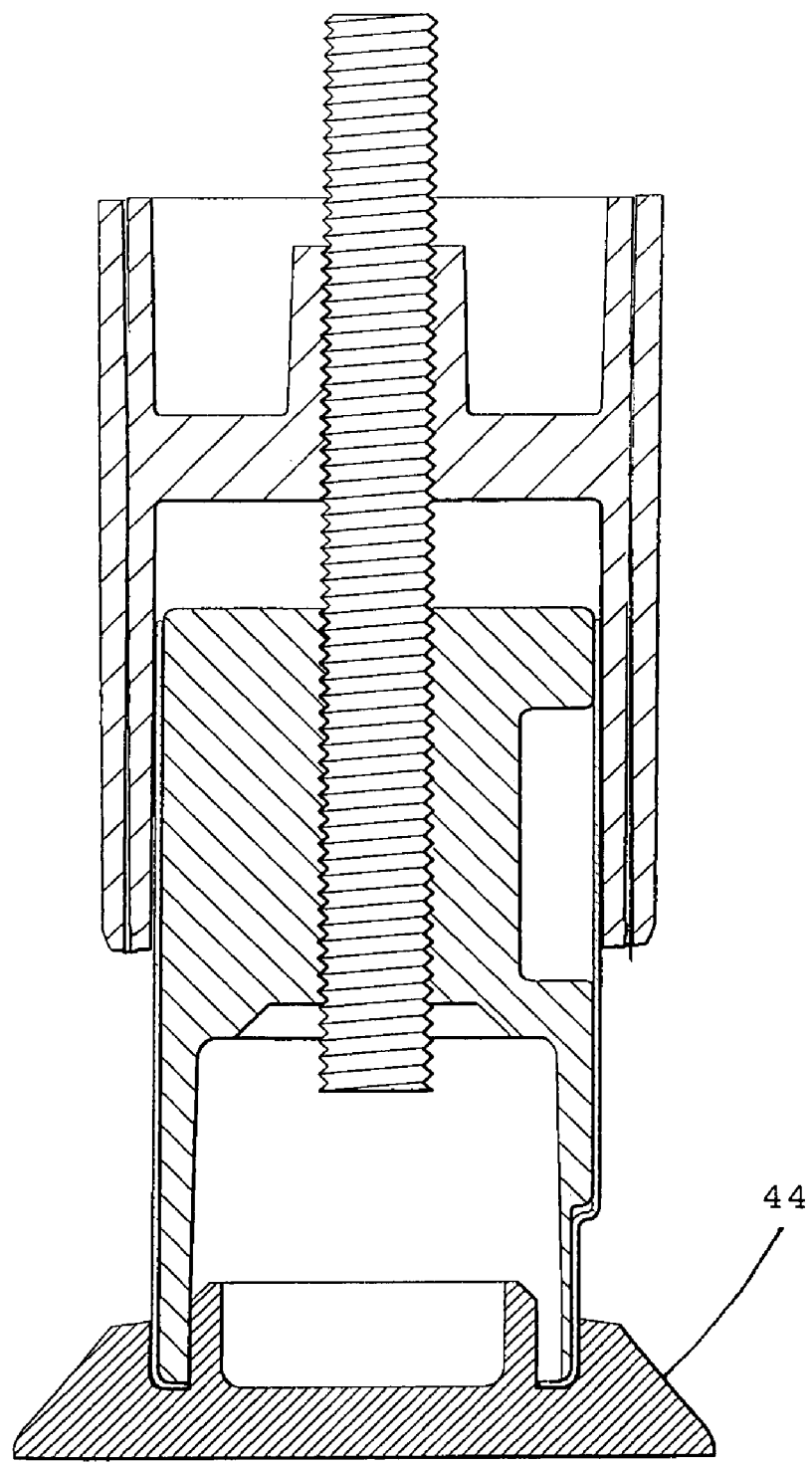
FIG. 5 is a side view of a height adjustable support shown in yet another preferred embodiment.

With reference next to FIG. 5, there is shown yet another preferred form of the invention. Here the support is essentially the same as that previously described in reference to FIGS. 2 and 3 except for the castor type glide being replaced by a non-skid foot-like end 44.

It should be understood that by molding the stud into the support body 15 the stud 17 is always mounted concentrically with respect to the support body. As such, the gap between the upper portion and the lower portion may be maintained within tight tolerances and without creating an asymmetric gap. Also, it should be understood that by encasing the support body 15 within the stainless steel sleeve 16 the upper portion is provided with a greater anti-deforming capability than with a plastic body alone. As such, should the support 10 contact an uneven floor surface or other impediment which would cause it to stop sliding across the underlying floor during the relocation of the kitchen equipment, the momentum of the kitchen equipment will not cause a breach of the integrity of the support upper section.

It should also be understood that the support may be mounted to the bottom of a stationary leg of a piece of equipment.

It thus is seen that a height adjustable support is now provided for food service equipment that is of simple and safe construction. Though the support is principally designed for use on food service equipment, it may of course be used on other floor supported items that need height adjustment. And though the invention has been shown and described in its preferred form, it should be understood that additions, deletions and modifications may be made without departure from the spirit and scope of the invention as set forth in the following claims.

The invention claimed is:

1. A height adjustable support for supporting food service equipment at different elevations above a supporting floor, the height adjustable support being adapted to be mounted to the bottom end of a leg of the food service equipment, and which comprises an upper portion and a lower portion, said upper portion having a tubular metal sleeve having a top edge and a bottom edge opposite said top edge, a plastic body fixedly mounted to and concentrically within said metal sleeve, and an externally threaded stud fixedly mounted concentrically within said plastic body to prevent rotational movement of said stud relative to said plastic body, said stud having a top section extending from said plastic body and past said top edge of said metal sleeve and a bottom section extending from said plastic body opposite said top section, said lower portion having a foot threadably coupled to said stud bottom section, whereby the support may be coupled onto said food service equipment by threading the top section of the stud into the equipment and whereby the height of the equipment may be adjusted by threadably positioning the lower portion along the bottom section of the threaded stud.

2. The support of claim 1 wherein said lower portion includes a castor.

3. The support of claim 1 wherein said lower portion includes is a wheel assembly.

4. The support of claim 1 wherein said lower portion includes is a non-skid foot.

5. The support of claim 1 wherein said stud top section and said stud bottom section are unitary.

6. A height adjustable support for supporting food service equipment at different elevations above a supporting floor, the height adjustable support being adapted to be mounted to the bottom end of a leg of the food service equipment, and which comprises a metal sleeve fixedly mounted to a plastic body having a central passage therethrough, said metal sleeve having a top edge and a bottom edge opposite said top edge, an externally threaded stud fixedly mounted within said central passage to prevent rotational movement of said stud relative to said plastic body, said threaded stud having a top section extending from said plastic body and past said top edge of said metal sleeve, said threaded stud also having a bottom section extending from said plastic body opposite said top section, and a foot having a threaded passage therein, said stud being threadably coupled within said foot threaded passage for threaded movement along said stud, whereby the support may be coupled to said food service equipment by threading the top end of the threaded stud into the equipment and whereby the elevation of the equipment may be adjusted by threadably positioning the foot along the lower end of the threaded stud.

7. The support of claim 6 wherein said foot is a castor.

8. The support of claim 6 wherein said foot is a wheeled leg.

9. The support of claim 6 wherein said foot is a non-skid foot.

10. The support of claim 6 wherein said stud top section and said stub bottom section are unitary.

* * * * *